United States Patent [19]
Walsh et al.

[11] Patent Number: 5,973,695
[45] Date of Patent: Oct. 26, 1999

[54] METHOD FOR GRAPHICALLY DISPLAYING A UNIX DIRECTORY STRUCTURE

[75] Inventors: Andrew J. Walsh, Plano; Troy A. Webre, Allen, both of Tex.

[73] Assignee: Electronic Data Systems Corporation, Plano, Tex.

[21] Appl. No.: 08/886,987

[22] Filed: Jul. 2, 1997

[51] Int. Cl.[6] ........................................... G06F 17/21
[52] U.S. Cl. ................................ 345/357; 707/501
[58] Field of Search ................................ 345/341, 357; 707/501

[56] References Cited

U.S. PATENT DOCUMENTS

| | | | |
|---|---|---|---|
| 5,432,903 | 7/1995 | Frid-Nielsen | 345/357 |
| 5,644,736 | 7/1997 | Healy et al. | 345/341 |

OTHER PUBLICATIONS

Edward Mendelson, "File–View Utilities." PC Magazine 16, No. 7 (Apr. 8, 1997): 153 et seq.

Goodman, Danny, *Danny Goodman's JavaScript Handbook,* Chapter Eighteen, "Application: Outline–Style Table of Conents", pp. 411–425, 1996.

An example of an interactive Javascript implementation of Application: Outline–Style Table of Contents, as available on www.dannyg.com/javascript/ol/outline.htm., pp. 1–2, 1999.

*Primary Examiner*—James P. Trammell
*Assistant Examiner*—John L. Young
*Attorney, Agent, or Firm*—L. Joy Griebenow; Baker & Botts L.L.P.

[57] ABSTRACT

A method for graphically displaying a UNIX directory includes the steps of identifying a base UNIX directory (44), and obtaining a listing of entries in the base UNIX directory, including all files, all subdirectories, and all files and subdirectories in the subdirectories (46, 64). For each entry, determining parameters including whether the entry is a file or a subdirectory, a level of indentation, and a uniform resource locator to the file (72, 74). An entry name and its associated parameters are then stored in a data structure (78, 82). An HTML document is then built for displaying all the entries in the data structure in a hierarchical graphical directory structure pane in a web page (48).

20 Claims, 3 Drawing Sheets

METHOD FOR GRAPHICALLY DISPLAYING A UNIX DIRECTORY STRUCTURE

TECHNICAL FIELD OF THE INVENTION

This invention is related in general to the field of computer software. More particularly, the invention is related to a method for graphically displaying a UNIX directory structure.

BACKGROUND OF THE INVENTION

In the UNIX operating system, the contents of a directory may be obtained by using the "ls" command. The ls command causes the directory files and subdirectories to be displayed in a list fashion, with no graphical indication of subdirectory hierarchical structures. The listing obtained using the ls command requires some knowledge of the ls command and the symbolic characters used in the resultant output in order to decipher the directory structure. Further, navigation in the directory and subdirectories requires less intuitive keyboard entry by the users. The typical change directory command, "cd", and the path name of the file or subdirectory must be entered via the keyboard to navigate to each subdirectory level.

SUMMARY OF THE INVENTION

Accordingly, there is a need for a more intuitive and graphical method to navigate in a UNIX directory and to easily view the contents of files stored in a UNIX directory.

In accordance with the present invention, a method for graphically displaying a UNIX directory is provided which eliminates or substantially reduces the disadvantages associated with prior methods.

In one aspect of the invention, a method for graphically displaying a UNIX directory includes the steps of identifying a base UNIX directory, and obtaining a listing of entries in the base UNIX directory, including all files, all subdirectories, and all files and subdirectories in the subdirectories. For each entry, determining parameters including whether the entry is a file or a subdirectory, a level of indentation, and a uniform resource locator to the file. An entry name and its associated parameters are then stored in a data structure. An HTML document is then built for displaying all the entries in the data structure in a hierarchical graphical directory structure pane in a web page.

BRIEF DESCRIPTION OF THE DRAWINGS

For a better understanding of the present invention, reference may be made to the accompanying drawings, in which.

DETAILED DESCRIPTION OF THE INVENTION

Figure 1:
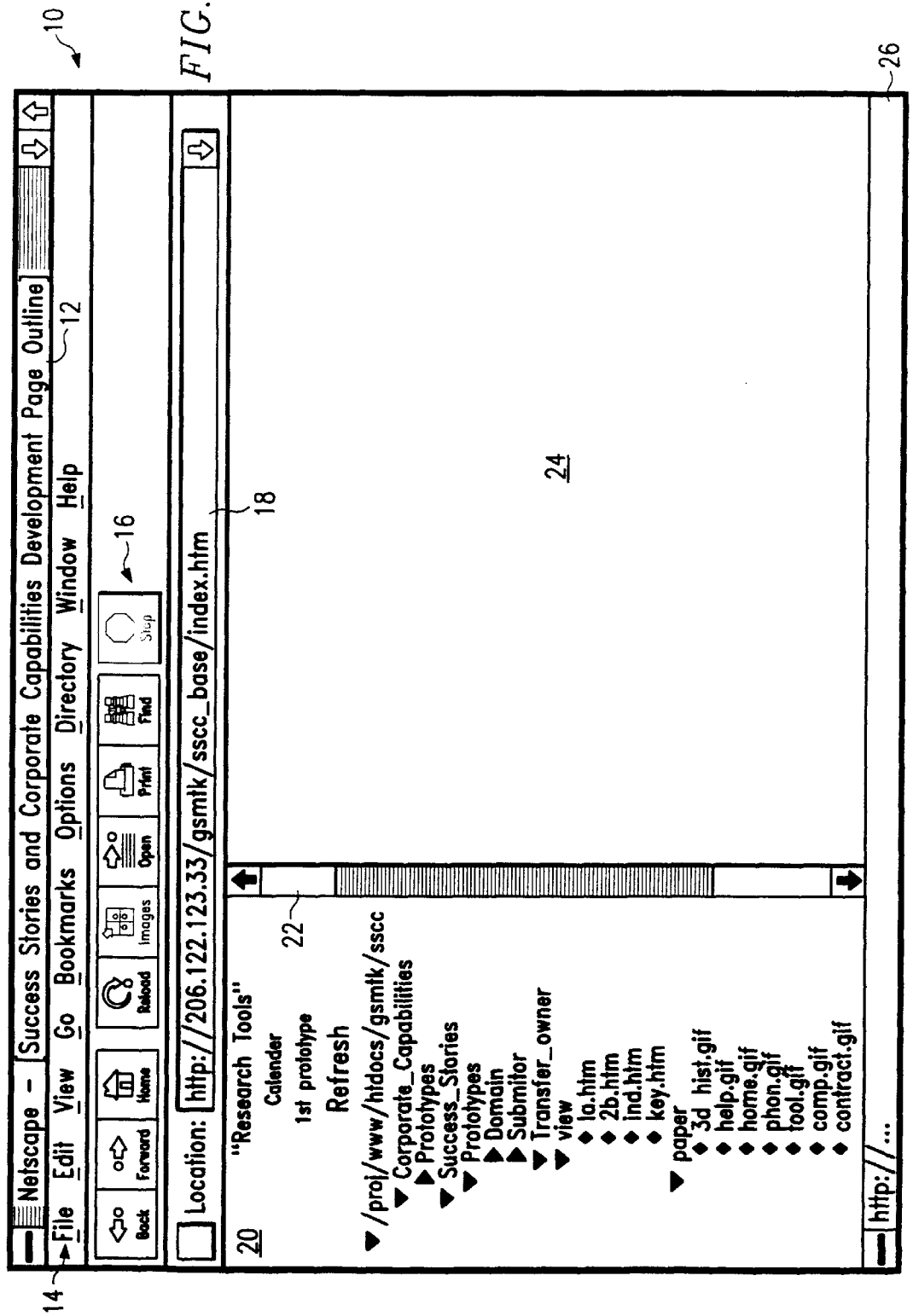
FIG. 1 is an exemplary screen having a first frame displaying a graphical hierarchical structure of a UNIX directory structure and a second frame displaying the contents of a file highlighted in the first frame according to the teachings of the present invention.

The preferred embodiment(s) of the present invention is (are) illustrated in FIGS. 1 through 4, like reference numerals being used to refer to like and corresponding parts of the various drawings.

FIG. 1 is an exemplary screen display 10 having a first frame 20 displaying a graphical hierarchical structure of a UNIX directory structure and a second frame 24 displaying the contents of a file highlighted in the first frame according to the teachings of the present invention. Exemplary screen display 10 may include all or some of the graphical features found on a typical World Wide Web (WWW or web) browser such as NETSCAPE NAVIGATOR® and MICROSOFT EXPLORER®. Screen 10 includes a page title 12 which helps to identify the contents of the page, a menu 14 that provides pull down lists of commands and functions, and a tool bar 16 that displays shortcut buttons with graphical or textual information for specific commands. Further, the uniform resource locator (URL) of the current page is displayed in a location field 18. A directory structure pane 20 provides a graphical display of a UNIX directory, constructed according to the teachings of the present invention.

For the example shown in FIG. 1, the root or base directory has a path of "/proj/www/htdocs/gsmtk/sscc" and it is headed by an inverted triangle symbol, ▼, for example. This symbol may be used to indicate that the contents of that directory is displayed. Under the root directory, a subdirectory is "Corporate_Capabilities" which is also led by the inverted triangle symbol. A subdirectory of "Corporate_Capabilities" directory is "Prototypes" which is led by a standing triangle, ▶, for example. This symbol indicates that the contents of the subdirectory is not displayed, and that by clicking on the subdirectory name or the symbol with a pointing device, such as a mouse or touch pad, the contents of the subdirectory will be displayed. Another subdirectory of the root directory is "Success_Stories" with its subdirectory of "paper." The subdirectory, "paper", contains a number of files, denoted by the symbol, ♦, for example.

In this manner, each UNIX directory and subdirectory displayed in directory structure pane 20 can be shown graphically with contents fully displayed (expanded) or hidden (collapsed), the state of which is indicated with proper leading symbols. A vertical scroll bar 22 is provided to traverse up and down directory structure pane 20. If necessary, a horizontal scroll bar (not shown) may also be provided to traverse directory structure pane 20 left and right. A directory content pane 24 is further provided to display the contents of a file that is selected in pane 20. Therefore, an instant visualization of file contents is realized. The size of directory structure pane 20 and directory content pane 24 may be changed by placing the mouse pointer over the border between the panes and clicking and dragging the pointer to resize the panes, for example. At the bottom of the screen, a status bar 26 may be used to provide a feedback or additional information about the screen element the mouse pointer is currently resting on, such as the uniform resource locator of a file.

Figure 2:
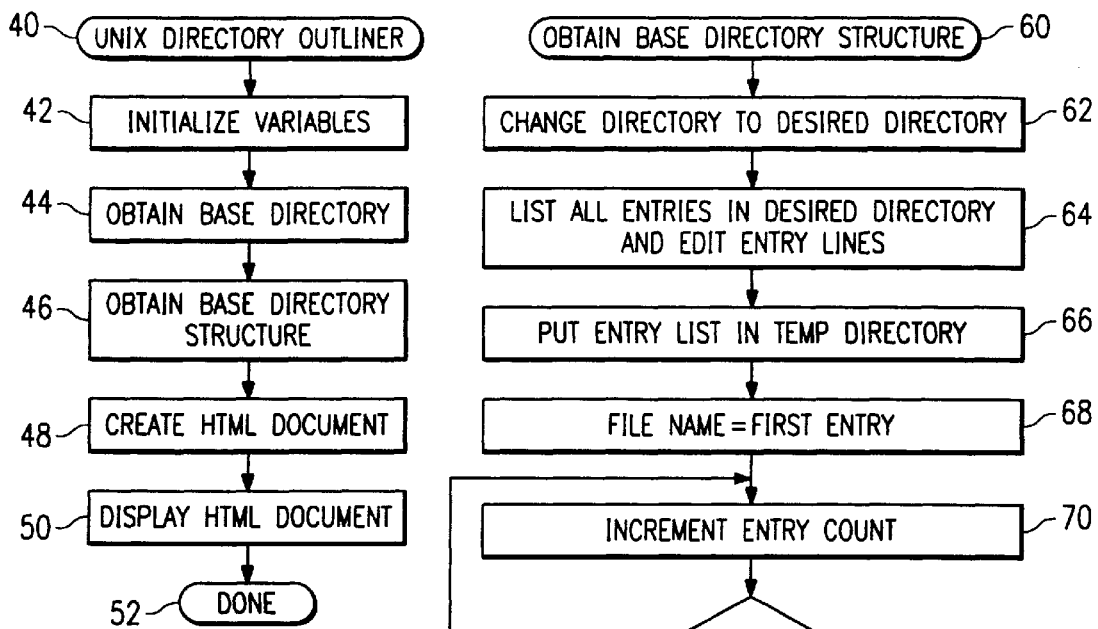
FIG. 2 is a flowchart of an exemplary process for a UNIX directory outliner process according to the teachings of the present invention.

FIG. 2 is a top level flowchart of the method for graphically displaying a UNIX directory 40 according to the teachings of the present invention. In step 42, variables are initialized if necessary, and in step 44, the root or base directory is identified by the user. The base directory structure is then obtained from the UNIX operating system and processed in step 46. An HTML (hypertext markup language) document is then created that contains the UNIX directory structure, and displayed in steps 48 and 50. The process ends in step 52.

Figure 3:
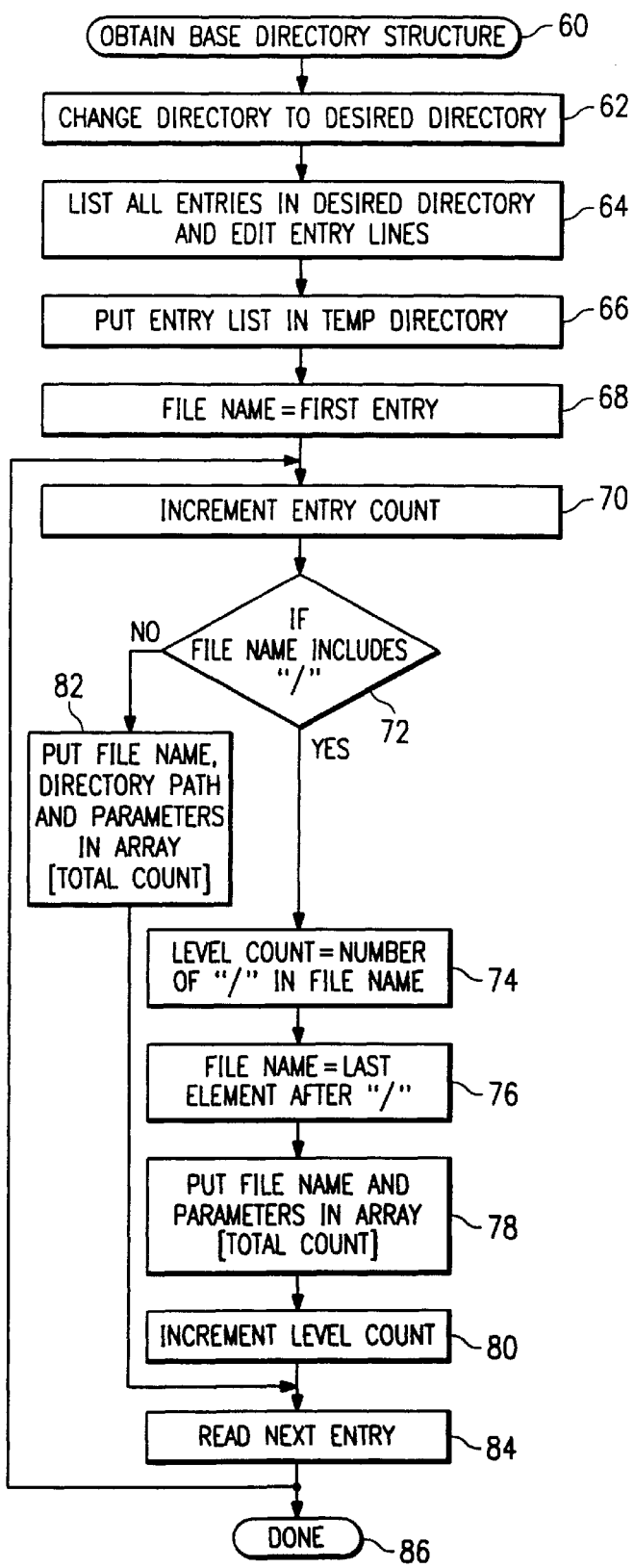
FIG. 3 is a flowchart of an exemplary process for obtaining a UNIX directory structure according to the teachings of the present invention.

FIG. 3 is a more detailed flowchart of the process 60 for obtaining the UNIX base directory structure. A variable identifying the current directory is first changed to the base directory identified by the user in step 62. All entries in the base directory is then listed and edited in step 64. This may be performed by the "ls" command. For example, the command:

```
ls –Rp|grep –v '/$'|grep –v '^$'|grep –v '^\.:'|tr –d
":$"|sed s/'^\.'// > /tmp/web_explorer_dir_list
``` obtains a list of all files, subdirectories, and subdirectory files, in the base directory, with the directory files ending in a "/" character. Then the command causes lines ending with a "/", blank lines, and lines ending with a ".:" to be removed. The leading "." in front of subdirectory names and ending ":" characters are also removed. This list is then put in a temporary file called "web_explorer_dir_list" in a "tmp" subdirectory as shown in step 66. In step 68, the first entry in the list is read and set equal to a file name variable. An entry count variable is incremented to maintain a total count of the number of entries in the directory in step 70. The file name variable is then examined to determine if it includes a "/" character in step 72. If it does, then in step 74 a level count variable is set equal to the number of "/" characters included in the file name variable, and the file name variable is reset to equal to the last element or character string that appears after the "/" character in step 76. The file name and its associated parameters are then entered into a data structure, such as an array indexed by the total number of entries in the base directory in step 78. The parameters are information used to display the file or subdirectory name, including a boolean indicating whether the current element is a subdirectory or not, the character string (file name) of the element, the uniform resource locator of the element, and the level count determined in step 74. The uniform resource locator of the element may be derived by concatenating the web directory name, base directory name, and subdirectory name with the file name, with the appropriate "/" characters demarcating each name. The level count variable is then incremented in step 80.

If, in step 72, it is determined that the file name does not include the "/" character, then in step 82 the file name and its associated parameters are also put into the array indexed by the total number of entries in the base directory. In step 84, the next entry is then read and processed in the same manner while there are still entries in the file until all entries are processed, and execution then ends in step 86. The resultant array contains all entries in the base directory and information on whether they are files or subdirectories, the file or subdirectory name (used as status bar text), the uniform resource locator of the file or subdirectory, and the level of indentation required in the display of each entry. This array is then used to create an HTML document that can be displayed by a web browser application. In an implementation of the present invention, process 60 is written as a Korn shell program.

Figure 4:
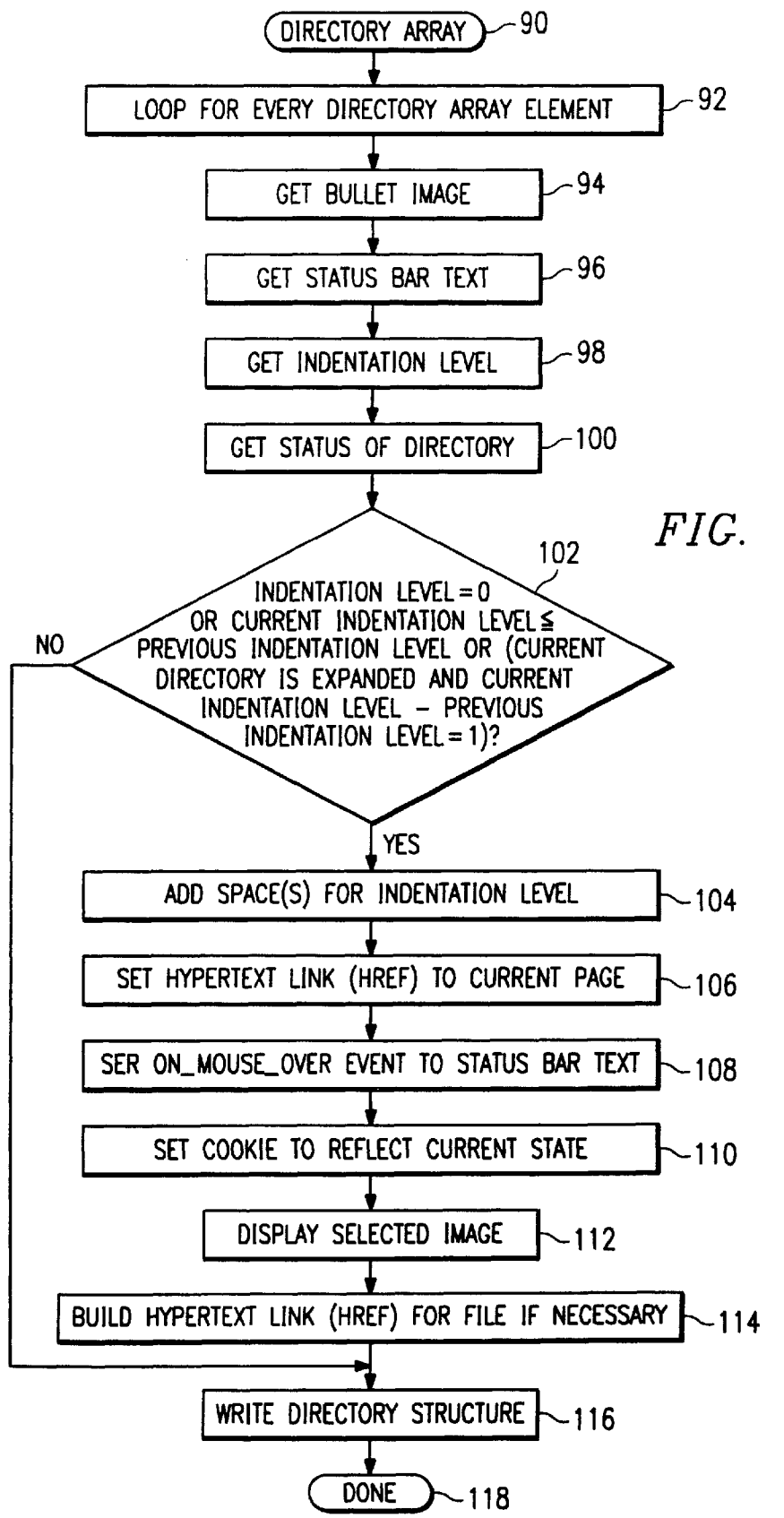
FIG. 4 is a flowchart of an exemplary process for determining a directory array according to the teachings of the present invention.

FIG. 4 is a flowchart of an exemplary process 90 for determining a directory array according to the teachings of the present invention. In step 92, a loop execution is established to process every element in the array. In step 94, a predetermined bullet image is obtained to indicate whether the current element is a file or subdirectory, and if a subdirectory, whether it is shown expanded or collapsed. For example, the ◆, ►, and ▼ symbols, as described above, may be used. In step 96, a status bar text is obtained from the array, which is one of the associated parameters of each entry in the directory file. In step 98, another parameter stored in the array, the indentation level, is also obtained. Further, the current status of the element, whether expanded or collapsed, is also obtained in step 100. Thereafter, three criteria are examined:

1. whether the indentation level is zero, or
2. the current indentation level is less than or equal to the previous indentation level, or
3. the current directory is expanded and the current indentation level minus the previous indentation level is equal to one.

If any of the three criteria is true, then in step 104, the number of spaces according to the indentation level is added to the file name string. A hypertext link tag (HREF) and parameters are set to the current web page in step 106. In step 108, an "onMouseOver" event of the pointer device is set to the status bar text obtained in step 96 so that when the pointer device is resting on the file, the status bar displays the proper text. In step 110, a cookie is set to reflect the current expanded or collapsed state of the current element. The selected bullet image, correctly reflecting the current state of the element, is then displayed in step 112. If necessary, the hypertext link to the current file is built in step 114. This process is repeated for all elements in the array, and then the HTML page of the directory structure is written in step 116, and the process ends in step 118.

The process shown in FIG. 4 may be written in JAVASCRIPT®. An example of a Javascript implementation is analyzed and described in *Danny Goodman's Javascript Handbook* by Danny Goodman (ISBN 0-7645-3003-8) pages 411–425, incorporated herein by reference. However, the process described by Danny Goodman uses a static array of objects that one may use to put the static objects in an outline format. In step 48 of process 40 shown in FIG. 2, a portion of Danny Goodman's Javascript code may be concatenated with the Javascript array of the directory listings created in process 60 of FIG. 3 to provide a dynamic directory listing of a UNIX directory.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A computer-platform independent method for graphically displaying a UNIX directory, comprising the steps of:

identifying a base UNIX directory;

obtaining a listing of entries in the base UNIX directory, including all files, all subdirectories, and all files and subdirectories in the subdirectories;

for each entry, determining parameters including whether the entry is a file or a subdirectory, a level of indentation, and a uniform resource locator to the file;

storing an entry name and parameters corresponding thereto for each entry in a data structure; and building a computer-platform independent HTML document for displaying all the entries in the data structure in a hierarchical graphical directory structure pane in a web page.

2. The method, as set forth in claim 1, further comprising the steps of:

obtaining a predetermined symbolic image in response to whether the entry is to be displayed collapsed or expanded; and adding a predetermined number of spaces for indenting the symbolic image and entry name in the directory structure pane.

3. The method, as set forth in claim 1, wherein the step of obtaining directory entries comprises the steps of:

using an ls command to obtain a list of all entries in the base UNIX directory;

editing the list to remove redundant entries;

editing the list to remove blank lines; and storing the edited list in a temporary file.

4. The method, as set forth in claim 3, further comprising the step of counting the total number of entries in the edited list.

5. The method, as set forth in claim 3, further comprising the steps of:

removing extraneous characters from the entry names; and removing lines having extraneous characters.

6. The method, as set forth in claim 3, further comprising the step of determining a level of nesting each entry is at in the directory hierarchy.

7. The method, as set forth in claim 4, wherein the step of storing the entry names and parameters comprises the step of storing the entry names and parameters in an array indexed by the total number of entries in the edited list.

8. The method, as set forth in claim 1, further comprising the step of providing a HREF tag to its uniform resource locator for each entry representing a file.

9. A computer-platform independent method for graphically displaying the contents of a UNIX directory, comprising the steps of:

identifying a base UNIX directory;

listing all entries in the base UNIX directory, including all files, all subdirectories, and all files and subdirectories in the subdirectories;

determining the total number of entries in the base UNIX directory and subdirectories;

for each entry, determining a plurality of parameters related thereto;

storing an entry name and the parameters corresponding thereto for each entry in an array indexable by the total number of entries; and building a computer-platform independent HTML document for displaying all the entries in the array in a hierarchical graphical directory structure pane in a web page.

10. The method, as set forth in claim 9, wherein the step for determining the plurality of parameters for each entry comprises the steps of:

determining whether the entry is a file or a subdirectory;

determining a level of indentation; and identifying a uniform resource locator to the entry if it is a file.

11. The method, as set forth in claim 1, further comprising the steps of:

obtaining a predetermined symbolic image in response to whether the entry is to be displayed collapsed or expanded; and adding a predetermined number of spaces for indenting the symbolic image and entry name in the directory structure pane.

12. The method, as set forth in claim 1, wherein the step of obtaining directory entries comprises the steps of:

using an ls command to obtain a list of all entries in the base UNIX directory;

editing the list to remove redundant entries;

editing the list to remove blank lines; and storing the edited list in a temporary file.

13. The method, as set forth in claim 12, further comprising the steps of:

removing extraneous characters from the entry names; and removing lines having extraneous characters.

14. The method, as set forth in claim 12, further comprising the step of determining a level of nesting each entry is at in the directory hierarchy.

15. The method, as set forth in claim 9, further comprising the step of providing a HREF tag to its uniform resource locator for each entry representing a file.

16. The method, as set forth in claim 15, further comprising the step of displaying contents of a file in a directory content pane of the web page when the file is selected in the hierarchical graphical directory structure pane in the web page.

17. A computer platform-independent method for graphically and intuitively displaying the hierarchical contents of a UNIX directory, comprising the steps of:

identifying a base UNIX directory;

obtaining a list of all entries in the base UNIX directory, including all files, all subdirectories, and all files and subdirectories in the subdirectories;

editing the list to remove redundancies and extraneous text;

counting the total number of entries in the edited list;

for each entry, determining a plurality of parameters related thereto;

storing an entry name and the parameters corresponding thereto for each entry in an array indexable by the total number of entries; and building a computer-platform independent HTML document for displaying all the entries in the array in a hierarchical graphical directory structure pane in a web page, and displaying the contents of an entry, if a file, in a directory contents pane in the web page.

18. The method, as set forth in claim 17, wherein the step for determining the plurality of parameters for each entry comprises the steps of:

determining whether the entry is a file or a subdirectory;

determining a level of indentation; and identifying a uniform resource locator to the entry if it is a file.

19. The method, as set forth in claim 17, further comprising the steps of:

obtaining a predetermined symbolic image in response to whether the entry is to be displayed collapsed or expanded; and adding a predetermined number of spaces for indenting the symbolic image and entry name in the directory structure pane.

20. The method, as set forth in claim 19, further comprising the step of providing a HREF tag to its uniform resource locator for each entry representing a file.

\* \* \* \* \*